United States Patent [19]

Hamabe et al.

[11] Patent Number: 5,319,795
[45] Date of Patent: Jun. 7, 1994

[54] CELLULAR MOBILE COMMUNICATIONS SYSTEM USING FREQUENCIES COMMONLY SHARED BY NEIGHBORING CELLS FOR HANDOFF OPERATIONS

[75] Inventors: Kojiro Hamabe; Yukitsuna Furuya; Toshihito Kanai; Masanori Taketsugu, all of Tokyo, Japan

[73] Assignee: NEC Corporation, Japan

[21] Appl. No.: 843,914

[22] Filed: Feb. 27, 1992

[30] Foreign Application Priority Data

Feb. 27, 1991 [JP] Japan ................... 3-057969

[51] Int. Cl.$^5$ ................... H04B 7/26; H04Q 7/02
[52] U.S. Cl. ................... 455/33.2; 379/60; 455/34.1; 455/54.2; 455/56.1; 455/137
[58] Field of Search ................ 455/33.1–33.4, 455/34.1, 54.1, 54.2, 56.1, 67.1, 137; 379/59, 60, 63

[56] References Cited

U.S. PATENT DOCUMENTS

5,109,390  4/1992  Gilhousen et al. ............ 455/33.2 X
5,175,867  12/1992  Wejke et al. ................ 455/33.2 X Primary Examiner—Reinhard J. Eisenzopf
Assistant Examiner—Chi Pham
Attorney, Agent, or Firm—Ostrolenk, Faber, Gerb & Soffen

[57] ABSTRACT

In a cellular mobile communication system, each base station is allocated common frequencies shared with other base stations in addition to unique frequencies. One of the unique frequencies is assigned by a base station to a mobile terminal in response to a call request. The field strength of a signal from that mobile terminal is detected and one of the common frequencies is assigned to it if the detected field strength becomes lower than a threshold. The base station receives a field strength signal from a neighboring station indicating the field strength of a version of the signal at the neighboring station and compares it with a threshold, and combines the signal of that mobile terminal with the version of the signal received by and relayed from the neighboring station when the field strength of that version of the signal is higher than the threshold. At the given mobile station, a signal from the base station which assigned the common frequency is combined with a signal from the neighboring station. In a modification, the field strength of signals from surrounding base stations is detected by mobile terminals and a start-of-diversity-mode request is transmitted when the field strength of one of the surrounding stations is higher than a threshold and an end-of-diversity-mode request signal is transmitted when the field strength of such a surrounding station is lower than the threshold. The base station responds to these requests for effecting diversity reception.

6 Claims, 9 Drawing Sheets

| Mobile's position | Base station X | Mobile station | Base station Y |
|---|---|---|---|
| Base station X to point A | $F_i \rightarrow$ <br> $\leftarrow f_i$ | $\rightarrow$ <br> $f_i \leftarrow$ |  |
| Point A to Point B | $F_j \rightarrow$ <br> $\leftarrow f_j$ | $\rightarrow$ <br> $f_j \leftarrow$ |  |
| Point B to Point C | $F_j \rightarrow$ <br> $\leftarrow f_j$ | $\rightarrow \leftarrow$ <br> $f_j \rightarrow$ | $\leftarrow F_k$ <br> $\rightarrow$ |
| Point C to Point D | $F_j \rightarrow$ <br> $\leftarrow f_k$ | $\rightarrow \leftarrow$ <br> $\rightarrow$ | $\leftarrow F_k$ <br> $\rightarrow$ |
| Point D to Point E |  | $\leftarrow$ <br> $f_k \rightarrow$ | $\leftarrow F_k$ <br> $\rightarrow$ |
| Point E to base station Y |  | $\leftarrow$ <br> $f_m \rightarrow$ | $\leftarrow F_m$ <br> $\rightarrow$ |

| Mobile's position | Base station X | Mobile station | Base station Y |
|---|---|---|---|
| Base station X to point $A_1$ | $F_i \longrightarrow$ <br> $\longleftarrow f_i$ | | |
| Point $A_1$ to Point $B_1$ | $F_j \longrightarrow$ <br> $\longleftarrow f_j$ | $\longleftarrow F_k$ <br> | |
| Point $B_1$ to Point $C_1$ | $F_j \longrightarrow$ <br> $\longleftarrow$ | $\longleftarrow F_k$ <br> $f_k \longrightarrow$ | |
| Point $C_1$ to base station Y | | $\longleftarrow$ <br> $f_m \longrightarrow$ | $F_m$ |

CELLULAR MOBILE COMMUNICATIONS SYSTEM USING FREQUENCIES COMMONLY SHARED BY NEIGHBORING CELLS FOR HANDOFF OPERATIONS

BACKGROUND OF THE INVENTION

The present invention relates generally to cellular mobile communications systems, and more particularly to such a system operating during handoffs.

With conventional cellular mobile communication system, unique frequencies are allocated to each cell site. In addition to the transmitter and receivers operating at the allocated frequencies, each cell site is provided with as many receivers as there are neighboring cell sites for receiving signals from mobile terminals for controlling handoffs. One shortcoming of the conventional system is that the number of such receivers is several times greater than the number of receivers operating at the allocated frequencies.

SUMMARY OF THE INVENTION

It is therefore an object of the present invention to provide a cellular mobile communication system having a smaller number of receivers for controlling handoffs.

According to one aspect of the present invention, the base station located at the cell site is allocated common frequencies which are shared with other base stations in addition to unique frequencies. One of the unique frequencies is assigned to a given mobile terminal in response to a call request from the land-line system or from the mobile terminal. The field strength of a signal from the given mobile terminal is detected and one of the common frequencies is assigned to the given mobile terminal if the detected field strength becomes lower than a threshold value. The base station which assigned the common frequency receives a field strength signal from a neighboring base station indicating the field strength of a version of the signal of the given mobile terminal at the neighboring base station and compares it with a threshold value. The base station includes a diversity combiner for combining the signal of the given mobile terminal with the version of the signal received by and relayed from the neighboring base station when the field strength of the version of the signal at the neighboring station is higher than the threshold value. Each mobile terminal comprises means for tuning to frequencies assigned by the base stations and a diversity combiner for combining a signal from the base station which assigned the common frequency with a signal from the neighboring base station.

In a preferred embodiment, each of the base stations having unique frequencies, a first group of common frequencies and a second group of common frequencies, the common frequencies of the first and second groups being shared with other base stations. One of the common frequencies of the first group is assigned to a given mobile terminal if the field strength detected at the own base station is lower than a threshold value and one of the common frequencies of the second group is assigned to the given mobile terminal when the field strength of a version of the same mobile's signal at the neighboring base station becomes lower than the detected field strength of the signal of the mobile terminal. In the given mobile terminal, a signal from the base station which assigned the common frequencies of the first and second groups is combined with a signal from the neighboring base station.

According to a second aspect of the present invention, each mobile terminal detects the field strength of signals transmitted from surrounding base stations and sends a start-of-diversity-mode request signal when the field strength of one of the surrounding base stations is higher than a threshold value and sends an end-of-diversity-mode request signal when the field strength of such a surrounding base station is lower than the threshold value. Each base station is allocated common frequencies shared with other base stations in addition to unique frequencies. One of the unique frequencies is assigned to a given mobile terminal in response to a call request from the land-line system or from the mobile terminal and one of the common frequencies is assigned to the given mobile terminal in response to the start-of-diversity-mode request signal. A diversity combiner is provided at the base station for combining the signal of the given mobile terminal with a version of the signal of the given mobile terminal which is received by and relayed from another base station during a period starting in response to the start-of-diversity-mode request signal and terminating in response to the end-of-diversity-mode request signal.

In a preferred embodiment, a change-of-frequency request signal is transmitted from the given mobile station when the field strength of the surrounding base station becomes lower than the field strength of another base station. Each of the base stations is allocated a first group of common frequencies and a second group of common frequencies in addition to the unique frequencies, the common frequencies of both groups being shared with other base stations. One of the common frequencies of the first group is assigned to the given mobile terminal in response to the start-of-diversity-mode request signal and one of the common frequencies of the second group is assigned to that mobile terminal in response to the change-of-frequency request signal.

BRIEF DESCRIPTION OF THE DRAWINGS

The present invention will be described in further detail with reference to the accompanying drawings, in which.

DETAILED DESCRIPTION

Figure 1:
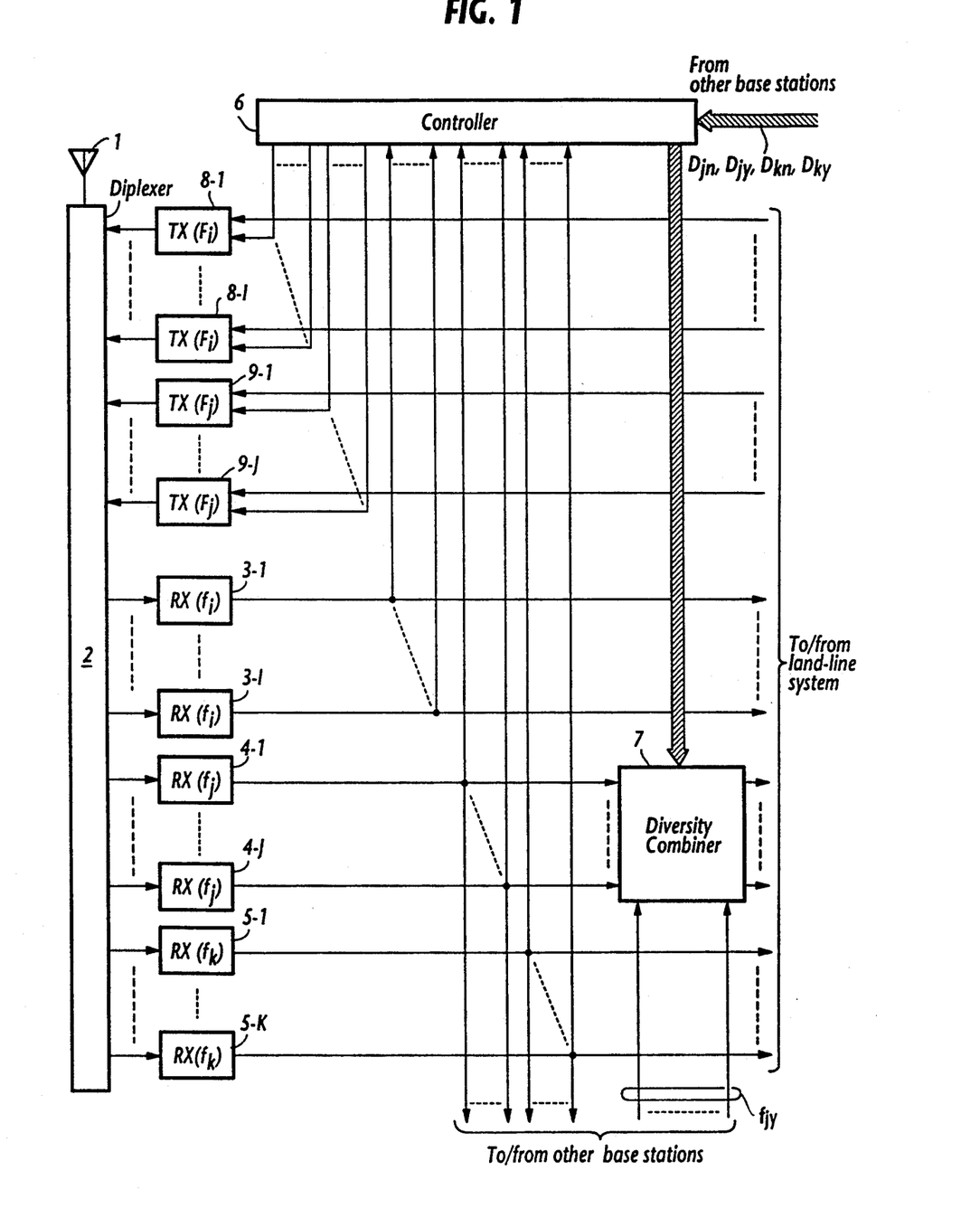
FIG. 1 is a block diagram of a base station of the cellular communications system of the present invention.

The cellular communications system for mobile telephony according to this invention includes a plurality of base stations respectively located at the cell sites. As shown in FIG. 1, each base station of this invention includes an antenna 1 coupled to a diplexer 1 to which a plurality of receivers and transmitters are connected. Receivers 3-1 through 3-I operate at frequencies $f_i$ (where $i = 1, 2 \ldots I$) which are uniquely allocated to the base station for receiving signals from mobile terminals located within the boundary of the own cell. Each signal from the mobile unit is time-division multiplexed with other mobile's signals on each of the assigned frequencies. Receivers 4-1 through 4-J are provided for use during an initial handoff operation and operate at frequencies $f_j$ (where $j = 1, 2, \ldots I$), and receivers 5-1 through 5-K are provided for use during a subsequent handoff operation and operate at frequencies $f_k$ (where $k = 1, 2, \ldots K$). The frequencies $f_j$ and $f_k$ are shared by neighboring base stations. The outputs of receivers 3-1 through 3-I are coupled to a controller 6 and further to a land-line system, or mobile telephone switching office, while the outputs of receivers 4-1~4-J are coupled to controller 6 and to a diversity combiner 7, and further to neighboring base stations. The outputs of receivers 5-1~5-K are coupled to controller 6, land-line system and neighboring stations. Diversity signals are also received from the neighboring stations and supplied to diversity combiner 7 to provide space diversity combining with a neighboring station. The outputs of diversity combiner 7 are coupled to the land-line system.

Time-division multiplexed transmit signals from the land-line system are supplied to transmitters 8-1—8-I for transmitting signals on a frequency $F_i$ as well as to transmitters 9-1—9-J for transmitting TDM signals on a frequency $F_j$, the outputs of transmitters 8 and 9 being coupled to diplexer 2. The selection of transmit frequencies is also controlled by controller 6.

Figure 2:
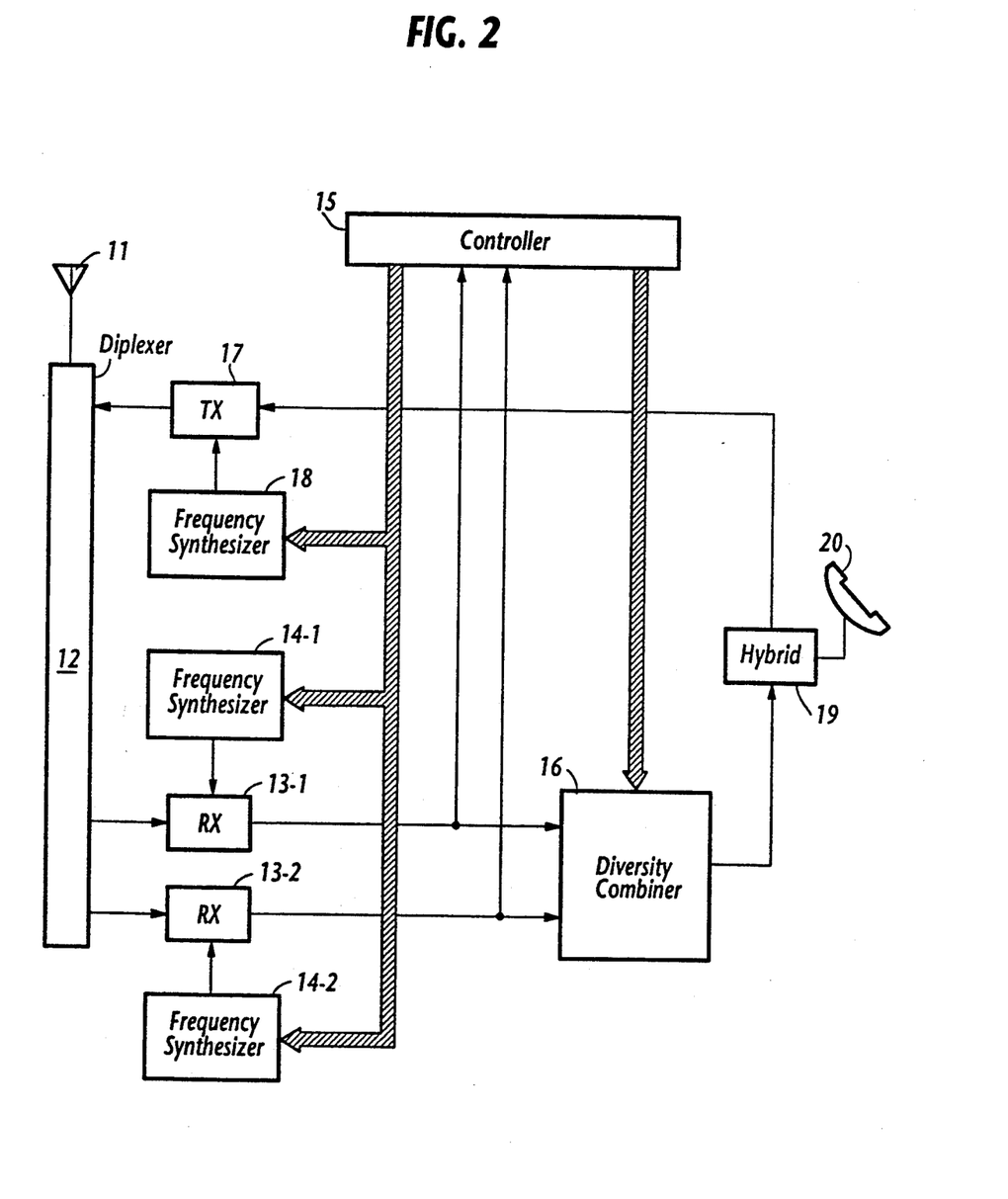
FIG. 2 is a block diagram of a mobile terminal of the cellular communications system of the present invention.

In FIG. 2, a mobile terminal comprises an antenna 11, a diplexer 12, and receivers 13-1, 13-2 to which local carriers are supplied from frequency synthesizers 14-1 and 14-2 under control of a controller 15. The outputs of receivers 13-1 and 13-2 are coupled to diversity combiner 16 in which signals received from neighboring base stations are diversity combined in a manner as will be described. The output of diversity combiner 16 is applied to a hybrid circuit 19 and thence to a handset 20. Transmit signal from the handset is coupled through hybrid 19 to a transmitter 17 whose carrier frequency is supplied from a frequency synthesizer 18 under control of the controller 15.

Figure 3A:
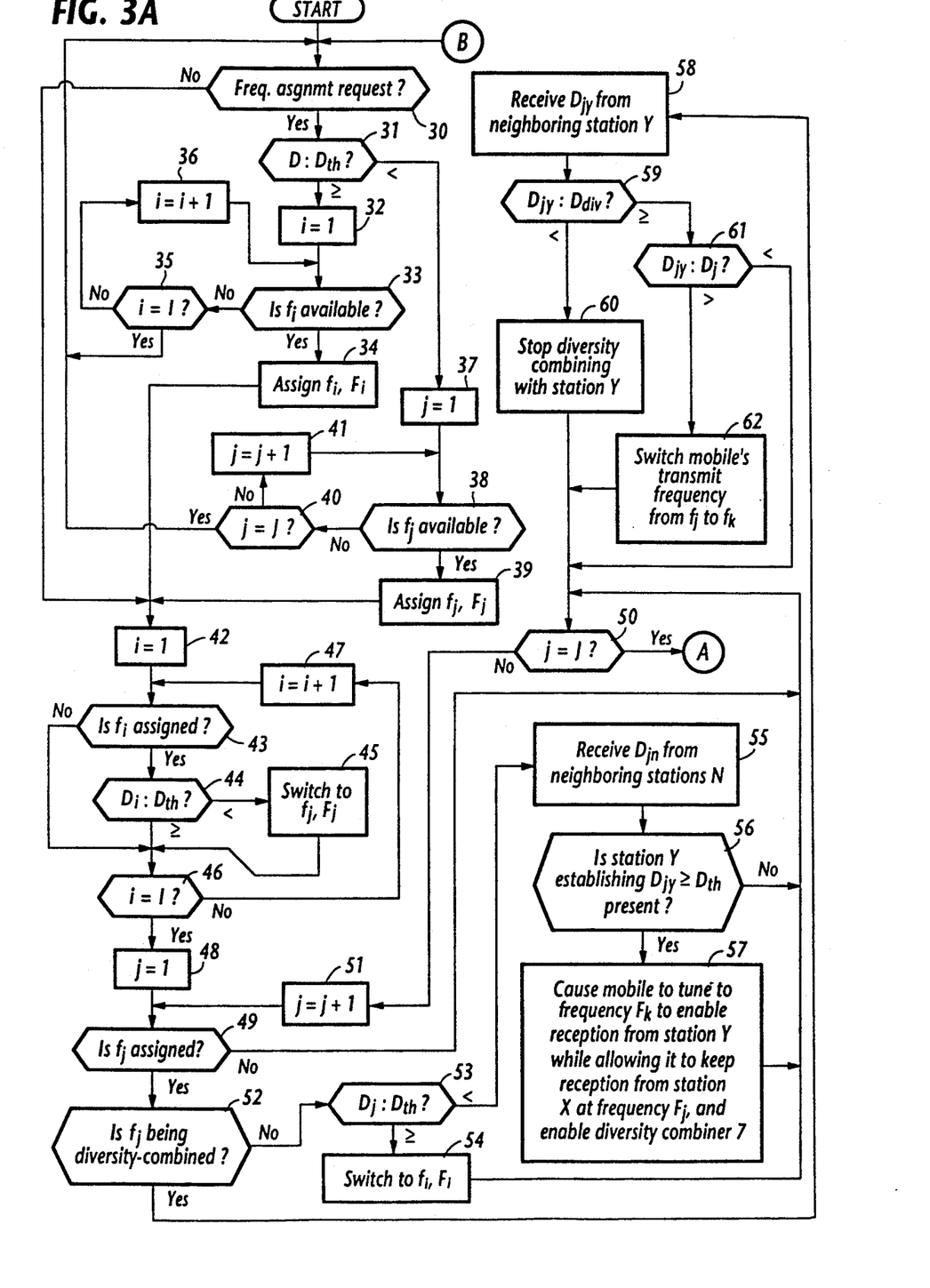
FIGS. 3A and 3B are flowcharts describing a sequence of programmed instructions performed by the controller of the base station according to a first embodiment of this invention.
Figure 3B:
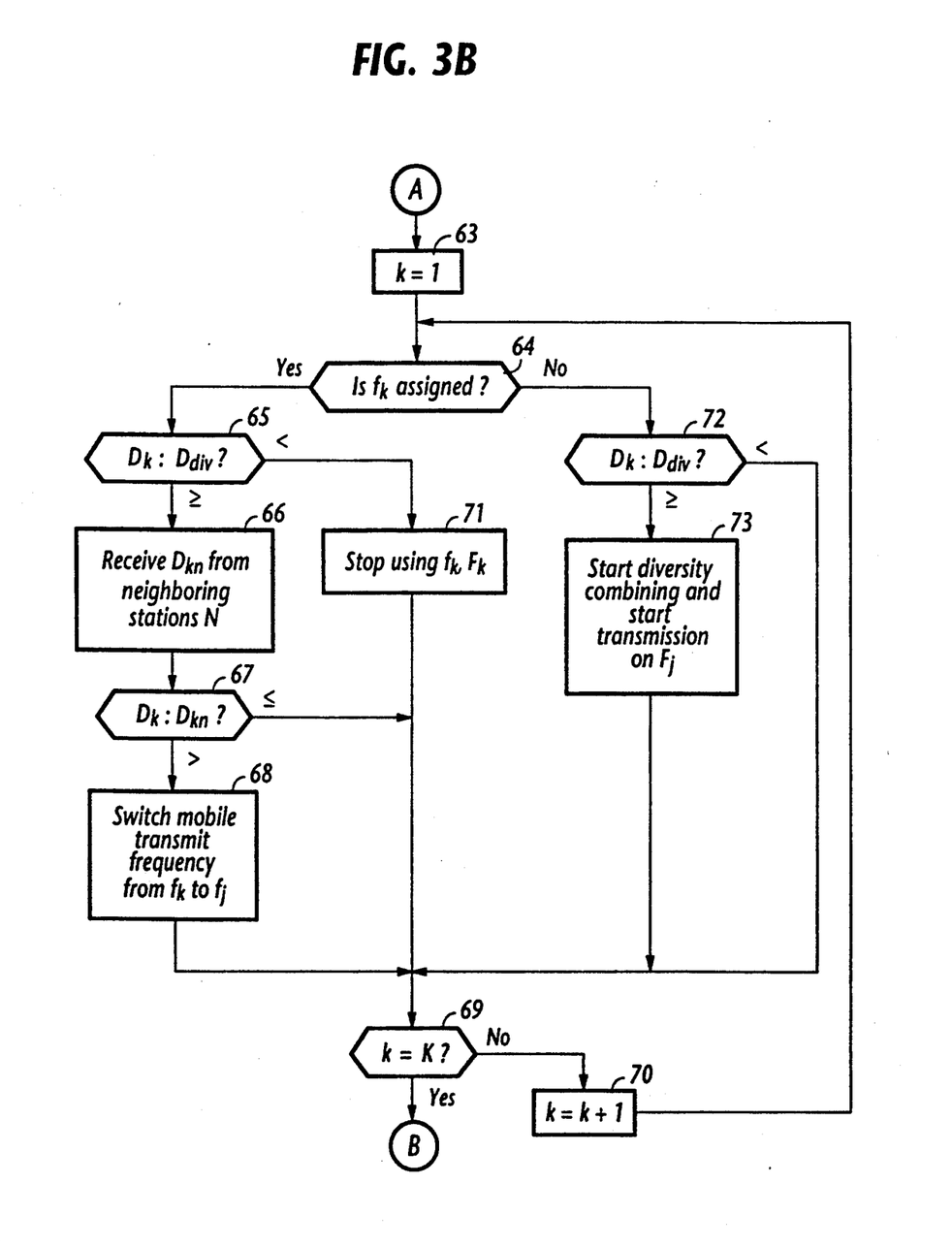
Figure 4:
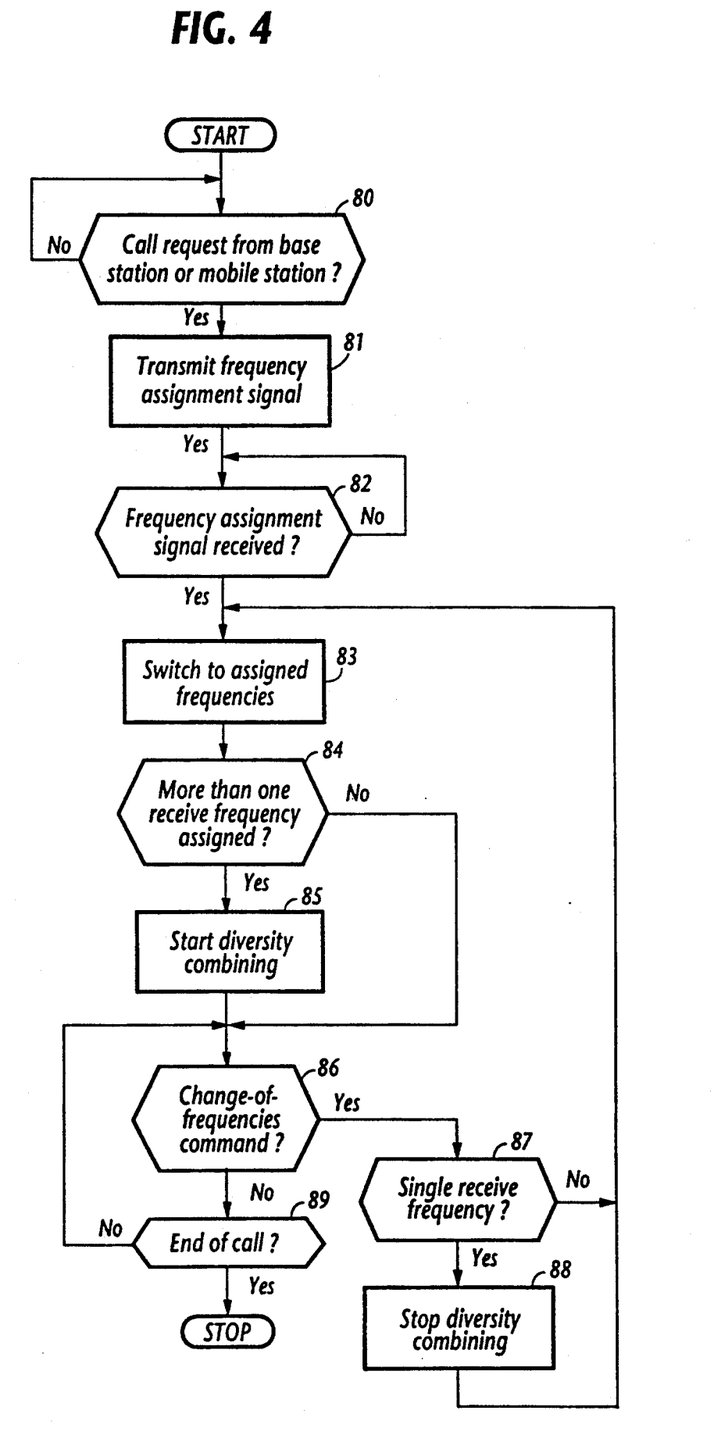
FIG. 4 is a flowchart describing a sequence of programmed instructions performed by the controller of the mobile terminal according to the first embodiment of this invention.

FIGS. 3A and 3B show details of programmed instructions to be performed by the controller 6 of the base station according to a first embodiment of this invention, FIG. 4 showing details of programmed instructions to be performed by the controller 15 of each mobile terminal according to the first embodiment.

In response to a frequency assignment request transmitted on a control (setup) channel from a mobile terminal (step 30, FIG. 3A), control branches at step 30 to step 31 to compare the field strength D of the received signal with a threshold value $D_{th}$. If $D \geq D_{th}$, control branches at step 31 to step 32 to reset a frequency variable i to one. Step 32 is followed by a decision step 33 in which the frequency $f_i$ is checked for availability.

Note that frequencies $f_i$ are allocated to a base station X for assignment to mobile terminals which are located within the cell X of that base station when a call is originated from or terminated to such mobile terminals and frequencies $f_m$ are allocated to a base station Y for assignment to mobile terminals which are located within the cell Y.

If $f_i$ is available, control branches to step 34 to assign frequencies $f_i$ and $F_i$ to the requesting mobile terminal by transmitting a frequency assignment signal to it and establishes mobile-to-base and base-to-mobile channels. If $f_i$ is not available, control branches at step 33 to step 35 to check to see if variable i is equal to a maximum value I. If the answer is negative, control branches to step 36 to increment variable i by one and returns to step 33 to check the next frequency for availability; otherwise it returns to step 30 to repeat the process. If the field strength D is determined by step 31 as being lower than threshold value $D_{th}$, control branches to step 37 to reset variable j to one and goes to step 38 to check to see if frequency $f_j$ is available. If not, control branches to step 40 to check to see if j=j. If frequency $f_i$ is available, exit then is to step 39 to assign frequencies $f_j$ and $F_j$ to the requesting mobile terminal. If variable j is not equal to j, control branches at step 40 to step 41 to increment variable j by one and returns to step 38 to repeat the process until j=j. If j=j, control branches at step 40 to the starting point of the program.

Therefore, the requesting mobile terminal is switched to voice-channel frequencies $f_i$ and $F_i$ if the signal level of the control channel is higher than the threshold level $D_{th}$. Otherwise, it is switched to frequencies $f_j$ and $F_j$.

Figure 5A:
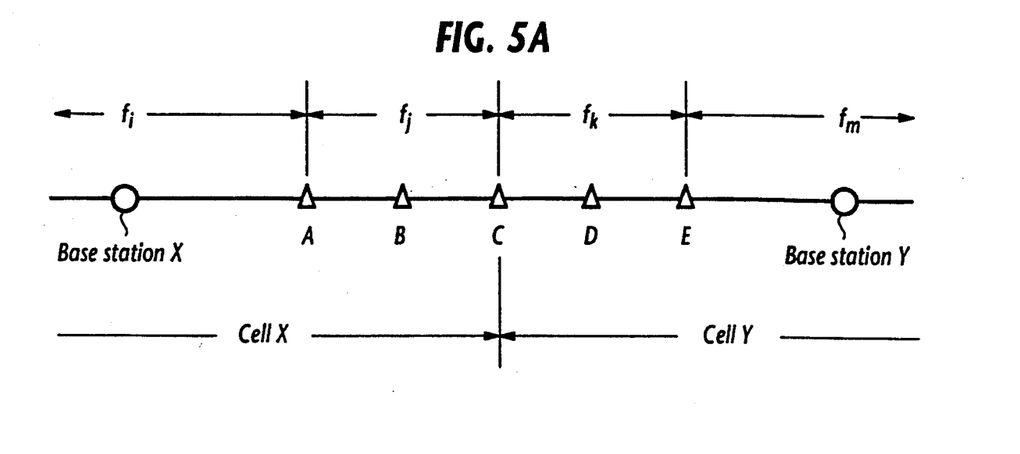
FIGS. 5A and 5B are schematic illustrations showing different points of a path between typical base stations travelled by mobile terminals and frequencies assigned to the mobile terminals according to the first embodiment of this invention.

It is assumed that a mobile terminal is traveling in a direction away from base station X to base station Y, passing through several points A, B, C, D and E as shown in FIG. 5A. The program execution now enters a handoff routine which begins with an initialization step 42 in which variable i is set to 1. Exit then is to step 43 to check to see if frequency $f_i$ is the one assigned to the mobile terminal. If the answer is affirmative, control braches to step 44 to detect the signal level $D_i$ of frequency $f_i$ for comparison with threshold level $D_{th}$.

When signal level $D_i$ will become lower than threshold level $D_{th}$, control branches to step 45 to switch the current frequencies of the mobile terminal to frequencies $f_j$ and $F_j$ and moves to step 46. If frequency $f_j$ is detected as being not assigned to any mobile terminal, or if level $D_i$ is equal to or greater than threshold $D_{th}$, control branches to step 46 to check to see if i=1. If i is not equal to 1, control branches to step 47 to increment variable i by one and returns to step 43 to repeat the process on the next frequency $f_i$.

Therefore, if a mobile terminal to which frequencies $f_i$ and $F_i$ have been assigned is crossing the point A, base station X will cause it to switch to frequencies $f_j$ and $F_j$.

Control then branches at step 46 to step 48 to set variable j to 1 and exits to decision step 49 to check to see if frequency $f_j$ is the one assigned to the mobile terminal. If the answer is negative, control branches to step 50 to check to see if j=j. If j is not equal to j, control branches to step 51 to increment it by 1 and returns to step 49. If an assigned frequency $f_j$ is detected, control branches at step 49 to step 52 to check to see if frequency $f_j$ from the mobile terminal is diversity-combined with a signal $f_{jn}$ from that mobile terminal relayed through a neighboring base station. If the answer is negative, control branches at step 52 to step 53 to compare the level $D_j$ of signal at frequency $f_j$ with threshold value $D_{th}$. If $D_j \geq D_{th}$, the program execution branches at step 53 to step 54 to switch to frequencies $f_i$ and $F_i$. This will occur if the mobile terminal has made a turn and is traveling backward to station X, crossing boundary point A (FIGS. 5A, 5B).

If $D_j < D_{th}$, control branches at step 53 to step 55 to receive field strength signals $D_{jn}$ detected by and sent from neighboring base stations N indicating the level of signals at frequency $f_j$ they are receiving from the mobile terminal. Exit then is to step 56 to determine if there is a base station Y that establishes the relation $D_{jy} \geq D_{th}$. If there is one, control branches to step 57 to cause the mobile terminal to tune to frequency $f_k$ to enable reception of signal from station Y while enabling it keep reception of signals at frequency $f_j$ from station X. Thus, the mobile terminal is able to start reception on a frequency diversity mode by combining signals at frequencies $F_j$ and $F_k$ received from stations X and Y, respectively. Concurrently, diversity combiner 7 of base station X is enabled by controller 6 to start space diversity combining on a frequency-$f_j$ signal received direct from the mobile terminal with a version of the same signal which is received by base station Y and relayed to base station X as a signal $f_{jy}$.

Figure 5B:
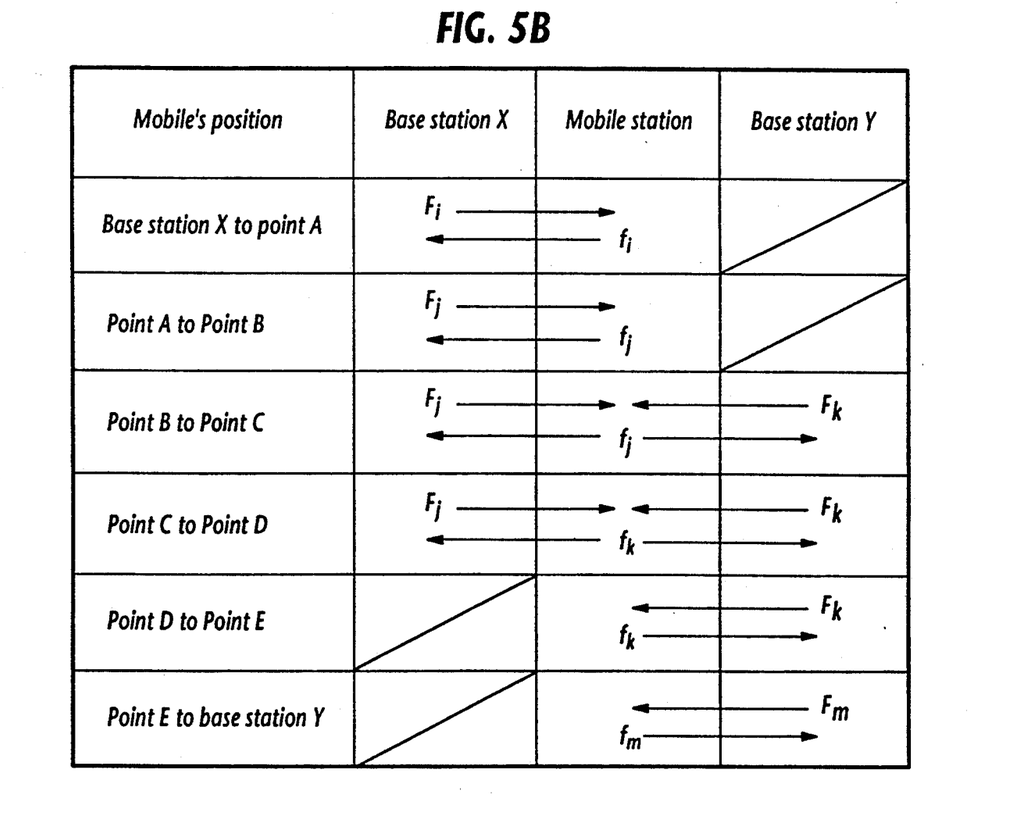

The execution of step 57 will occur when the mobile terminal is entering an area between points B and C (FIGS. 5A, 5B). Following the execution of step 57, control returns to step 50 to repeat the process on the next one of the commonly shared frequencies $f_j$.

When control subsequently passes through step 52, affirmative decision will be made and it branches at step 52 to step 58 to receive the field strength signal $D_{jy}$ from station Y and exits to step 59 to compare it with a diversity threshold value $D_{div}$. If $D_{jy} < D_{div}$, control branches to step 60 to stop the diversity combining with the station Y. This will occur when the mobile terminal has made a turn on its way to station Y and crossed the boundary between points A and B, traveling backward to the starting point of the trip. If $D_{jy} \geq D_{div}$, control branches at step 59 to step 61 to compare $D_{jy}$ with the level $D_j$ of the signal received by the own base station direct from the mobile terminal. If $D_{jy} > D_j$, control branches at step 61 to step 62 to cause the mobile terminal to switch its transmit frequency from $f_j$ to one of available frequencies $f_k$. This will take place when the mobile terminal is entering an area between points C and D (FIGS. 5A, 5B).

With the mobile-to-base channel frequency being switched to $f_k$, the program execution now enters a subroutine in which frequency $f_k$ is monitored while the mobile terminal continues traveling to station Y. This subroutine begins with step 63 (FIG. 3B) in which frequency variable k is set equal to 1. Exit then is to decision step 64 to check to see if frequency $f_k$ is the one assigned to the mobile terminal. If the answer is affirmative, control branches at step 64 to step 65 to compare the signal level $D_k$ of frequency-$f_k$ signal with the diversity threshold level $D_{div}$. If $D_k \geq D_{div}$, control branches to step 66 to receive field strength signals $D_{kn}$ from neighboring stations N indicating the levels of signals received by these station from the mobile terminal, and proceeds to step 67 to compare the level $D_k$ with the level $D_{kn}$ of each of these signals. If the mobile terminal has made a turn and is traveling backward, the signal level $D_k$ will be become greater than any of levels $D_{kn}$, and control branches at step 67 to step 68 to cause the mobile terminal to switch its transmit frequency from $f_k$ to $f_j$ and advances to step 69 to check to see if $k=K$. If the answer is affirmative, control returns to the starting point of the program; otherwise it branches to step 70 to increment the k-value by one and returns to step 64 to repeat the process.

If the mobile terminal has crossed the point E, approaching base station Y, step 65 will eventually determine that the level $D_k$ is smaller than diversity threshold $D_{div}$, and the program execution branches to step 71 to stop using frequencies $f_k$ and $F_k$ and proceeds to step 69, terminating a handoff procedure.

Before base station X ceases communication with the mobile terminal, a neighboring base station, which may be located close to station Y, will detect the frequency-$f_k$ signal from the mobile terminal and establishes a situation appropriate to effect space-diversity combining at frequency $f_k$ with station Y, while transmitting base-to-mobile signals at frequency $F_j$ to permit the mobile terminal to continue frequency-diversity reception. Therefore, the companion base station with which base station Y has been working on space diversity mode has changed from station X to that neighboring station. This will occur when control of the neighboring station determines that frequency $f_k$ is not the one assigned by that neighboring station, and branches at step 64 to step 72 to compare $D_k$ with threshold $D_{div}$. If $D_k \geq D_{div}$, control advances to step 73 to start diversity combining on frequency $f_k$ and starts transmitting the signal to the mobile terminal at frequency $F_k$. Otherwise, control branches at step 72 to step 69.

Each base station is executing a set of similar handoff routines with the exception that frequency variables j and k being transposed with each other. Namely, when base station X is executing a handoff routine with frequency variables i, j and k, it is simultaneously executing another handoff routine with frequency variables j and k transposed in position with each other. Therefore, base station Y is executing a handoff routine with the transposed frequency variables j and k when an approaching mobile terminal has crossed the point E and causes it to switch from commonly shared frequencies $f_k$ and $F_k$ to frequencies $f_m$ and $F_m$ which are allocated to base station Y for assignment to mobile terminals traveling within its cell.

Referring to FIG. 4, the program execution of the mobile terminal associated with the program of FIGS. 3A and 3B begins with decision step 80 which checks to see if a call request is generated by the mobile unit or received from a base station. If the answer is affirmative, control branches to step 81 to transmit a frequency assignment request. After receiving a frequency assignment signal (step 82), control executes step 83 by switching the mobile's operating frequencies to the assigned frequencies. Control determines that if there is more than one receive frequency assigned (step 84). If this is the case, control branches at step 84 to step 85 to enable diversity combiner 16 to start frequency diversity reception on signals received at different frequencies by receivers 13-1 and 13-2. Following a negative decision of step 84 or execution of step 85, step 86 is executed by checking to see if a change-of-frequencies signal is received from the base station. If the answer is affirmative, control branches at step 86 to step 87 to determine if there is only one receive frequency to be switched into operation. If the answer is negative, control branches at step 87 to step 83 to repeat the process; otherwise it branches to step 87 to cease the diversity reception mode and returns to step 83.

Before terminating the program, decision step 89 is looped as long as the answer is negative in step 85 in order to check for the end of the call.

With the previous embodiment, the decision to effect diversity or nondiversity mode of reception is made by base stations using threshold values which are determined to accommodate a sufficient amount of safety margin for using frequencies which are uniquely assigned to base stations. Therefore, diversity mode of reception accounts for a substantial proportion of each call duration, requiring a sufficient number of commonly shared frequencies for each of different bands $f_j$ and $f_k$.

Figure 6:
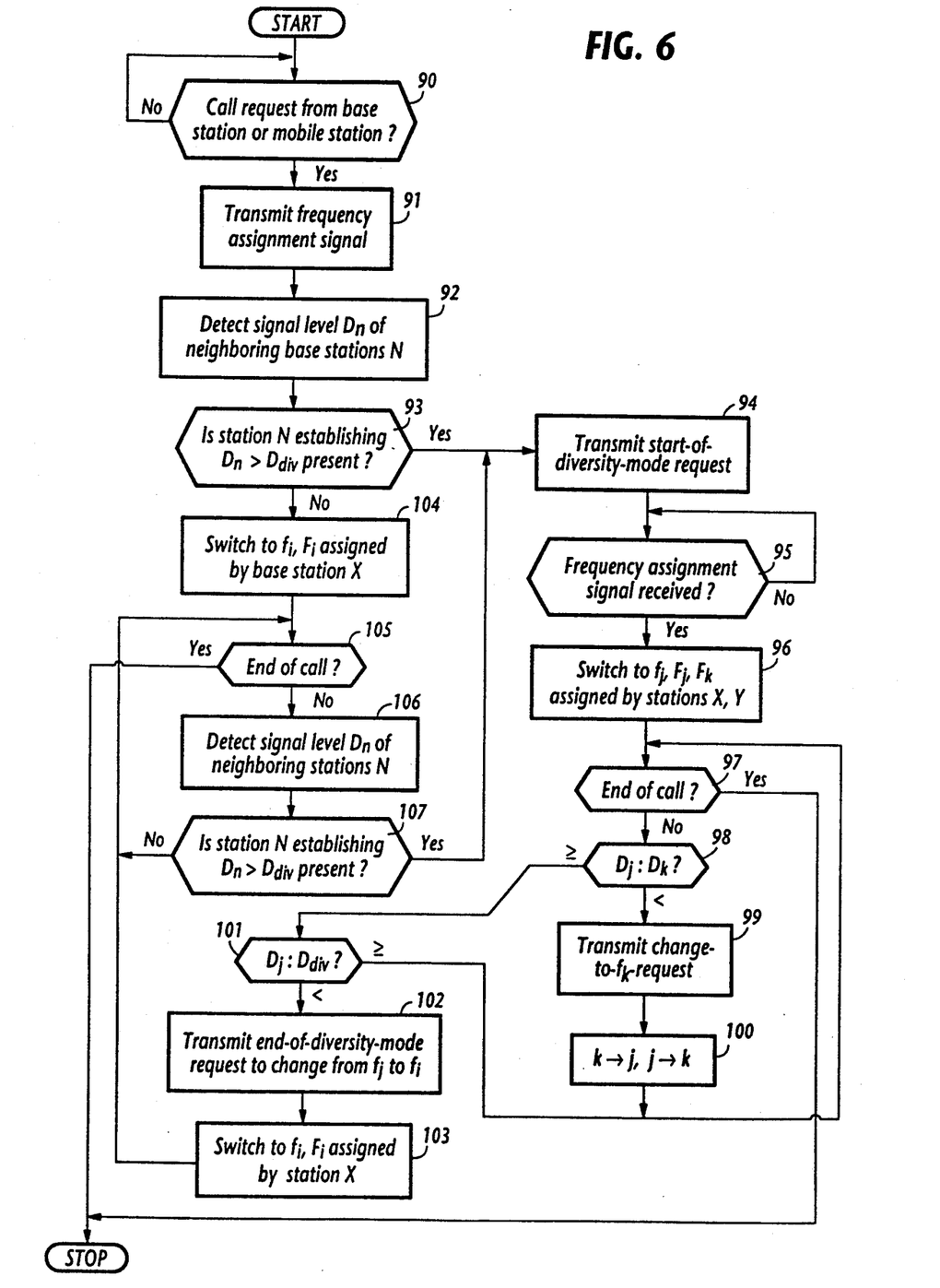
FIG. 6 is a flowchart describing a sequence of programmed instructions performed by the controller of the mobile terminal according to a second embodiment of this invention.
Figure 7:
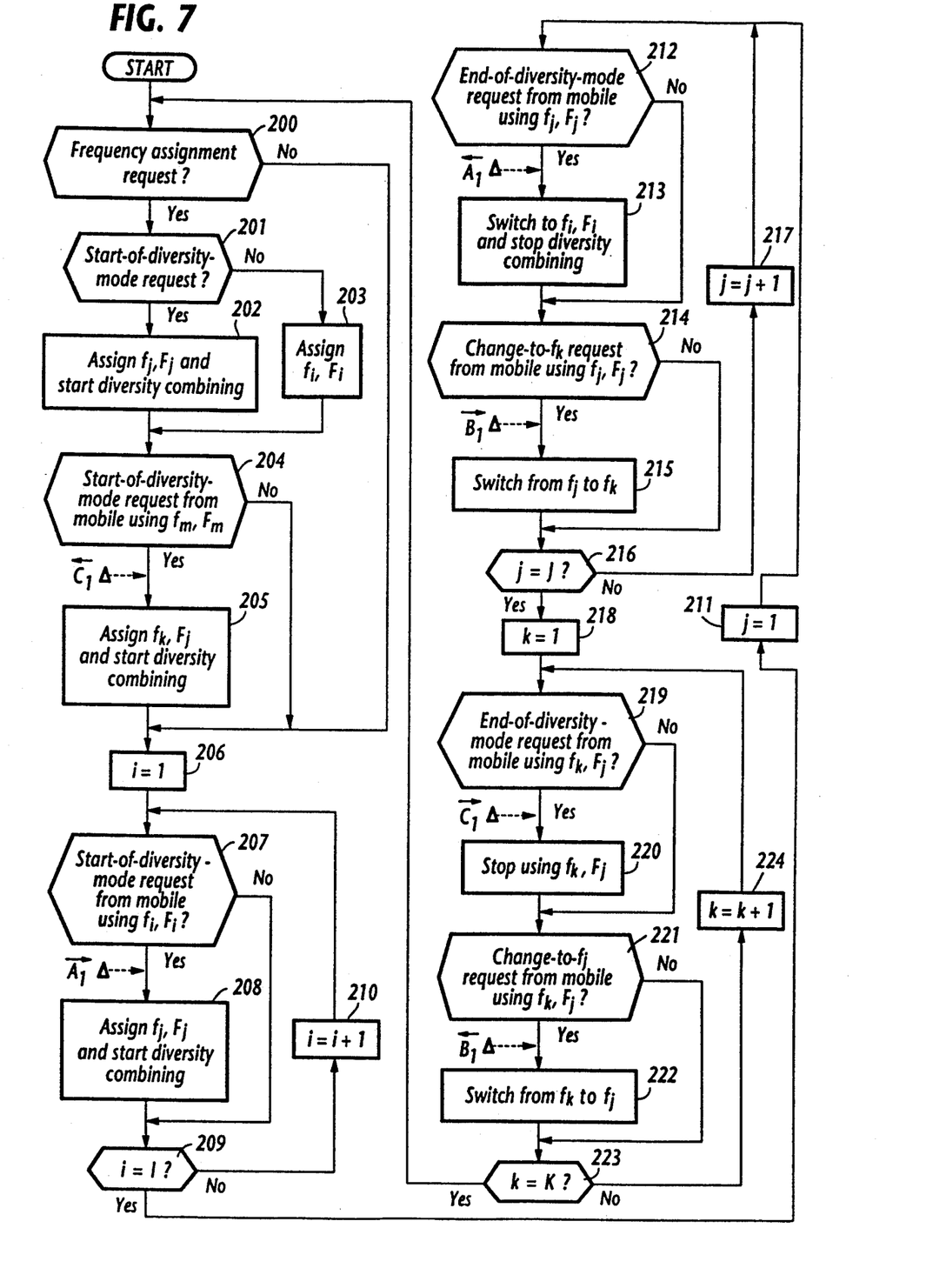
FIG. 7 is a flowchart describing a sequence of programmed instructions performed by the controller of the base station according to the second embodiment of this invention.

In a modified embodiment shown in FIGS. 6 and 7, the right to make a decision on diversity or nondiversity mode of reception is on the side of mobile terminals. Since field strength measurement can be precisely detected as a factor for determining the operational mode, the time during which the mobile terminal is allowed to use uniquely assigned frequencies can be extended, reducing the time in which to use commonly assigned frequencies. Therefore, the number of commonly shared frequencies can be reduced in comparison with the previous embodiment.

Referring to FIG. 6, a mobile terminal starts executing a program with step 90 in which it checks to see if a call request is generated by the mobile terminal or received from a base station. If the answer is affirmative, control branches to step 91 to transmit a frequency assignment signal on a control channel. Exit then is to step 92 to scan control channels of surrounding base stations to detect their field strengths $D_n$. Control proceeds to step 93 to determine if there is a station that establishes the relation $D_n > D_{div}$. If the answer is negative, control branches at step 93 to step 103 to switch its transmit and receive frequencies fi and Fi assigned by base station X, and proceeds to step 104.

If the answer is affirmative in step 93, control branches at step 93 to step 94 to transmit a start-of-diversity-mode request to such base stations X and Y. As will be described, each of such base stations assigns frequencies in response to the start-of-diversity-mode request. Control exits to step 95 to check for the receipt of a frequency assignment signal. If the answer is affirmative, control exits to step 96 to switch the mobile's transmit frequency to $f_j$, and mobiles' receive frequencies to $F_j$ and $F_k$. Exit then is to step 97 to check for an-end-of-call situation. If the call is still in progress, control branches at step 97 to step 98 to detect field strength $D_j$ and $D_k$ of signals at frequencies $f_j$ and $f_k$ and make a comparison between $D_j$ and $D_k$.

If $D_j < D_k$, control branches at step 98 to step 99 to switch the mobile's transmit frequency from $f_j$ to $f_k$ and proceeds to step 100 to transpose frequency variables k to j and j to k, with control returning to step 97 to repeat the process.

If $D_j \geq D_k$, control branches at step 98 to step 101 to compare the level $D_j$ of the stronger signal with diversity threshold $D_{div}$. If $D_j \geq D_{div}$, steps 97 through 100 are repeated, and if $D_j < D_{div}$, control branches at step 101 to step 102 to transmit an end-of-diversity-mode request to switch the base station receive frequency from $f_j$ to $f_i$. Control now exits to step 103 to switch its transmit and receive frequencies to $f_i$ and $F_i$ assigned by station X. Control moves to step 105 to check for an end-of-call situation and branches to step 106 if the call is in progress. Control channels are scanned and their field strengths are determined as $D_n$ (step 106) and comparisons are made between $D_n$ and $D_{div}$ to determine if base stations are present which are establishing the relation $D_n > D_{div}$. If the answer is affirmative, control branches at step 107 to step 94. Otherwise, control branches at step 107 to step 105 to repeat the process.

In FIG. 7, the program execution of a base station starts with decision step 200 in which control checks to see if a frequency assignment request is received from a mobile terminal. If the answer is negative, control branches to step 206. Otherwise, it branches to step 201 to check to see if a start-of-diversity-mode request is received. If it is, the program execution branches to step 202 to select available frequencies $f_j$ and $F_j$ and transmit a frequency assignment signal to the mobile terminal. If a start-of-diversity-mode request is not received within a specified period, control branches at step 201 to step 203 to select available frequencies $f_i$ and $F_i$ and transmit a frequency assignment signal to the mobile terminal.

Following the execution of step 202 or 203, control now enters a handoff routine which begins with step 204 to determine if a start-of-diversity-mode request is received from a mobile terminal to which frequencies $f_m$ and $F_m$ were assigned by base station Y and is approaching base station X. If the answer is negative, control branches at step 204 to step 206 to set variable i to one, and if affirmative, it branches to step 205 to assign frequencies $f_k$ and $F_j$ and starts diversity combining on the assigned frequencies, and then proceeds to step 206.

Figure 8A:
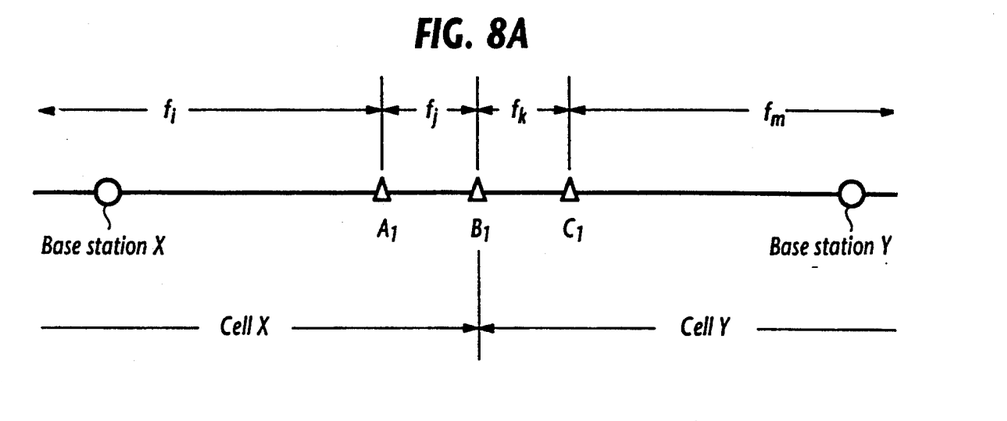
FIGS. 8A and 8B are schematic illustrations showing different points of a path between typical base stations travelled by mobile terminals and frequencies assigned to the mobile terminals according to the second embodiment of this invention.
Figure 8B:
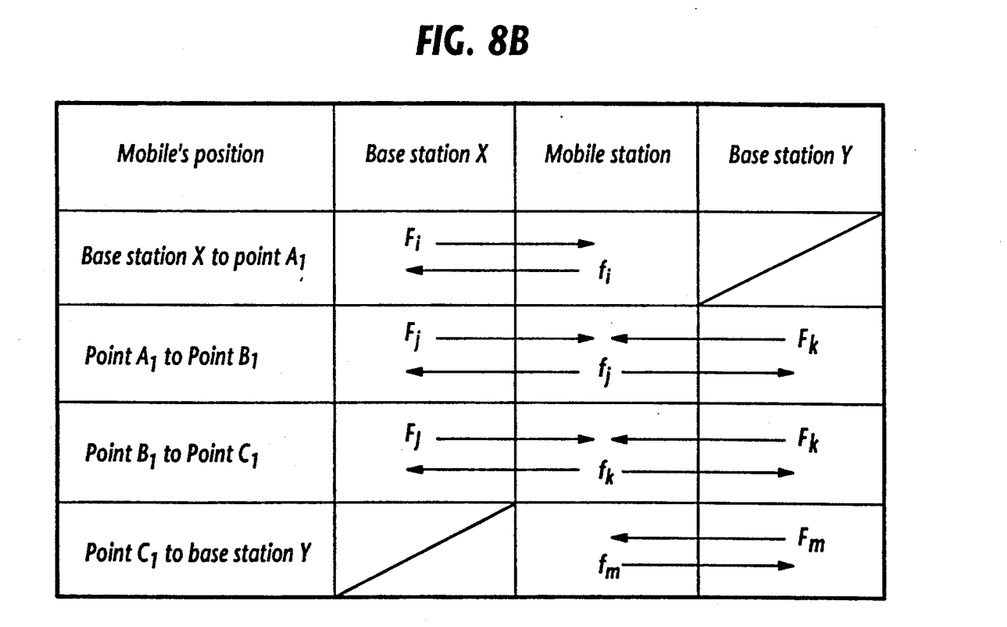

If a mobile terminal is traveling from station Y toward station X (see FIG. 8A, 8B) and crossing a point $C_1$, it is operating on frequencies $f_j$, $F_j$, $F_k$ (step 96, FIG. 6), control will branch at step 204 to step 205. Since station Y is executing a similar handoff routine and assigns a frequency Fk to that mobile terminal, the latter enters a diversity reception mode by combining a frequency-$F_j$ signal received from station X and a frequency-$F_k$ signal received from station Y. On the other hand, the frequency-$f_k$ signal sent from the mobile terminal is received by base stations X and Y and diversity combined by station X.

Step 207 is then executed and a check is made whether a start-of-diversity-mode request is received from a mobile terminal using frequencies $f_i$ and $F_i$ which were assigned by station X and is traveling away from station X. When this mobile terminal crosses a point $A_1$ (FIG. 8A, 8B), the answer will be affirmative at step 207 and control branches to step 208 to assign frequencies $f_j$ and $F_j$ and starts diversity combining. In a manner similar to the mobile terminal crossing the point $C_1$, the mobile terminal crossing the point $A_1$ is switched to frequencies $f_j$, $F_j$ and $F_k$, and proceeds to effect diversity combining on a frequency-$F_j$ signal received from station X and a frequency-$F_k$ signal received from station Y, whereas the frequency-$f_k$ signal sent from this mobile terminal is received by base stations X and Y and diversity combined by station X.

If the answer is negative at step 207, control branches to step 209 to check for i=1. Frequency variable i is incremented by one (step 210) until variable i becomes equal to 1 (step 209).

If the answer is affirmative, control branches at step 209 and enters a subroutine for mobile terminals traveling between points $A_1$ and $B_1$. The subroutine begins with step 211 by setting variable j to one. Control then exits to step 212 to check to see if an end-of-diversity-mode request is received from a mobile terminal using frequencies $f_j$ and $F_j$. If this request is received from a mobile terminal crossing the point $A_1$ in a direction approaching base station X, the answer is affirmative at step 212 and control branches to step 213 to switch the base and mobile's frequencies to $f_i$ and $F_i$ and discontinue the diversity reception mode.

If no end-of-diversity-mode request is received from such mobile terminals, or if step 213 is executed, control moves to step 214 to check to see if a change-to-$f_k$ request is received from a mobile terminal operating on frequencies $f_j$ and $F_j$. The decision of step 214 will be affirmative if there is a mobile terminal crossing a point $B_1$ in a direction away from station X (FIGS. 8A, 8B), and control branches at step 214 to step 215 to switch the base and mobile's frequencies to $f_j$ and $F_j$. Variable j is checked (step 216) for equality to j and is incremented by one (step 217) in a loop including steps 212 through 216.

If an affirmative decision is made at step 216, control enters a subroutine for mobile terminals traveling between points $B_1$ and $C_1$. This subroutine starts with step 218 in which frequency variable k is set to one. Exit then is to step 219 to check to see if an end-of-diversity-mode request is received from a mobile terminal operation on frequencies $f_k$ and $F_j$. If there is a mobile terminal crossing the point $C_1$ in a direction toward station Y, an end-of-diversity-mode request will be received and an affirmative decision will be made at step 219. Control branches to step 220 to stop using frequencies $f_k$ and $F_j$.

If there is no mobile terminal crossing the point $C_1$ in a direction approaching station Y, or if step 220 is executed, control advances to step 221 to check for the reception of a change-to-$f_j$ request signal. This signal will be received from a mobile terminal crossing the point $B_1$ in a direction away from station Y. When this occurs, control branches at step 221 to step 222 to switch the base and mobile's frequencies from $f_k$ to $f_j$ and proceeds to step 223 to check to see if variable k is equal to K. If not, control branches at step 223 to step 224 to increment variable k by one and returns to step 219 to repeat the process. If k=K, control branches at step 223 and returns to the starting point of the program.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A cellular mobile communications system for serving mobile terminals within a plurality of cells, the system including a plurality of base stations respectively located at the cell sites;

each of said base stations having unique frequencies and common frequencies shared with other base stations, each of the base stations comprising:
receiver means for receiving a signal from a given mobile terminal;
means for assigning one of the unique frequencies to said given mobile terminal in response to a call request;
field strength detector means for detecting the field strength of the signal received by said receiver means;
means for assigning one of the common frequencies to said given mobile terminal if the detected field strength is lower than a first threshold value;
comparator means for receiving a field strength signal from a neighboring base station indicating the field strength of a version of the signal of said given mobile terminal at said neighboring base station and comparing the field strength signal with a second threshold value;
diversity combiner means for receiving said version of the signal of said given mobile terminal from said neighboring base station and combining the same with the signal of said given mobile terminal received by said receiver means when the field strength signal is determined by said comparator means to be higher than said second threshold value, and
each of said mobile terminals comprising means for tuning to frequencies assigned by the base stations and diversity combiner means for combining a signal from the base station which assigned said common frequency with a signal from said neighboring base station.

2. A cellular mobile communications system for serving mobile terminals within a plurality of cells, the system including a plurality of base stations respectively located at the cell sites;

each of said base stations having unique frequencies, a first group of common frequencies and a second group of common frequencies, said common frequencies of the first and second groups being shared with other base stations, each of the base stations comprising:
receiver means for receiving a signal from a given mobile terminal;
means for assigning one of the unique frequencies to said given mobile terminal in response to a call request;
field strength detector means for detecting the field strength of the signal received by said receiver means;
means for assigning one of the common frequencies of the first group to said given mobile terminal if the detected field strength is lower than a first threshold value;
comparator means for receiving a field strength signal from a neighboring base station indicating the field strength of a version of the signal of said given mobile terminal at said neighboring base station and comparing the field strength signal with a second threshold value;
diversity combiner means for receiving said version of the signal of said given mobile terminal from said neighboring base station and combining the same with the signal of said given mobile terminal received by said receiver means when the field strength signal is determined by the comparator means to be higher than said second threshold value; and
means for assigning one of the common frequencies of the second group to said given mobile terminal when the field strength signal is determined by said comparator means to be lower than the field strength detected by said field strength detector means, and each of said mobile terminals comprising means for tuning to frequencies assigned by the base stations and diversity combiner means for combining a signal from the base station which assigned said common frequencies of the first and second groups with a signal from said neighboring base station.

3. A cellular mobile communications system as claimed in claim 2, wherein the signal from the base station is transmitted to the given mobile terminal at one of the common frequencies of the first group and the signal from said neighboring base station is transmitted to the given mobile terminal at one of the common frequencies of the second group.

4. A cellular mobile communications system for serving mobile terminals within a plurality of cells, the system including a plurality of base stations respectively located at the cell sites, each of the mobile terminals comprising:

means for detecting the field strength of signals transmitted from surrounding base stations;

means for transmitting a start-of-diversity-mode request signal when the field strength of one of said surrounding base stations is higher than a threshold value;

means for transmitting an end-of-diversity-mode request signal when the field strength of said one of the surrounding base stations is higher than the field strength of another base station but lower than said threshold value; and means for tuning to frequencies assigned by the base stations, each of said base stations having unique frequencies and common frequencies shared with other base stations, each base station comprising:

receiver means for receiving a first version of a signal from a given mobile terminal;

means for assigning one of the unique frequencies to a given mobile terminal in response to a call request;

means for assigning one of the common frequencies to said given mobile terminal in response to said start-of-diversity-mode request signal; and diversity combiner means for receiving a second version of the signal of said given mobile terminal from a neighboring base station and combining the first and second versions of the signal of said given mobile terminal during a period starting in response to said start-of-diversity-mode request signal and terminating in response to the end-of-diversity-mode request signal.

5. A cellular mobile communications system for serving mobile terminals within a plurality of cells, the system including a plurality of base stations respectively located at the cell sites, each of the mobile terminals comprising:

means for detecting the field strength of signals transmitted from surrounding base stations;

means for transmitting a start-of-diversity-mode request signal when the field strength of one of said surrounding base stations is higher than a threshold value;

means for transmitting an end-of-diversity-mode request signal when the field strength of said one of the surrounding stations is higher than the field strength of another base station but lower than said threshold value and a change-of-frequency request signal when the field strength of said one of the surrounding base stations is lower than the field strength of said another base station; and means for tuning to frequencies assigned by the base stations, each of said base stations having unique frequencies, a first group of common frequencies and a second group of common frequencies, the common frequencies of both groups being shared with other base stations, each base station comprising:

receiver means for receiving a first version of a signal from a given mobile terminal;

means for assigning one of the unique frequencies to said given mobile terminal in response to a call request;

means for assigning one of the common frequencies of the first group to said given mobile terminal in response to said start-of-diversity-mode request signal and assigning one of the common frequencies of the second group in response to said change-of-frequency request signal; and diversity combiner means for receiving a second version of the signal of said given mobile terminal from a neighboring base station and combining the first and second versions of the signal of said given mobile terminal during a period starting in response to said start-of-diversity-mode request signal and terminating in response to the end-of-diversity-mode request signal.

6. A cellular mobile communications system as claimed in claim 5, wherein the signal from the base station is transmitted to a given mobile terminal at one of the common frequencies of the first group and the signal from said neighboring base station is transmitted to the given mobile terminal at one of the common frequencies of the second group.

* * * * *